Feb. 17, 1925.

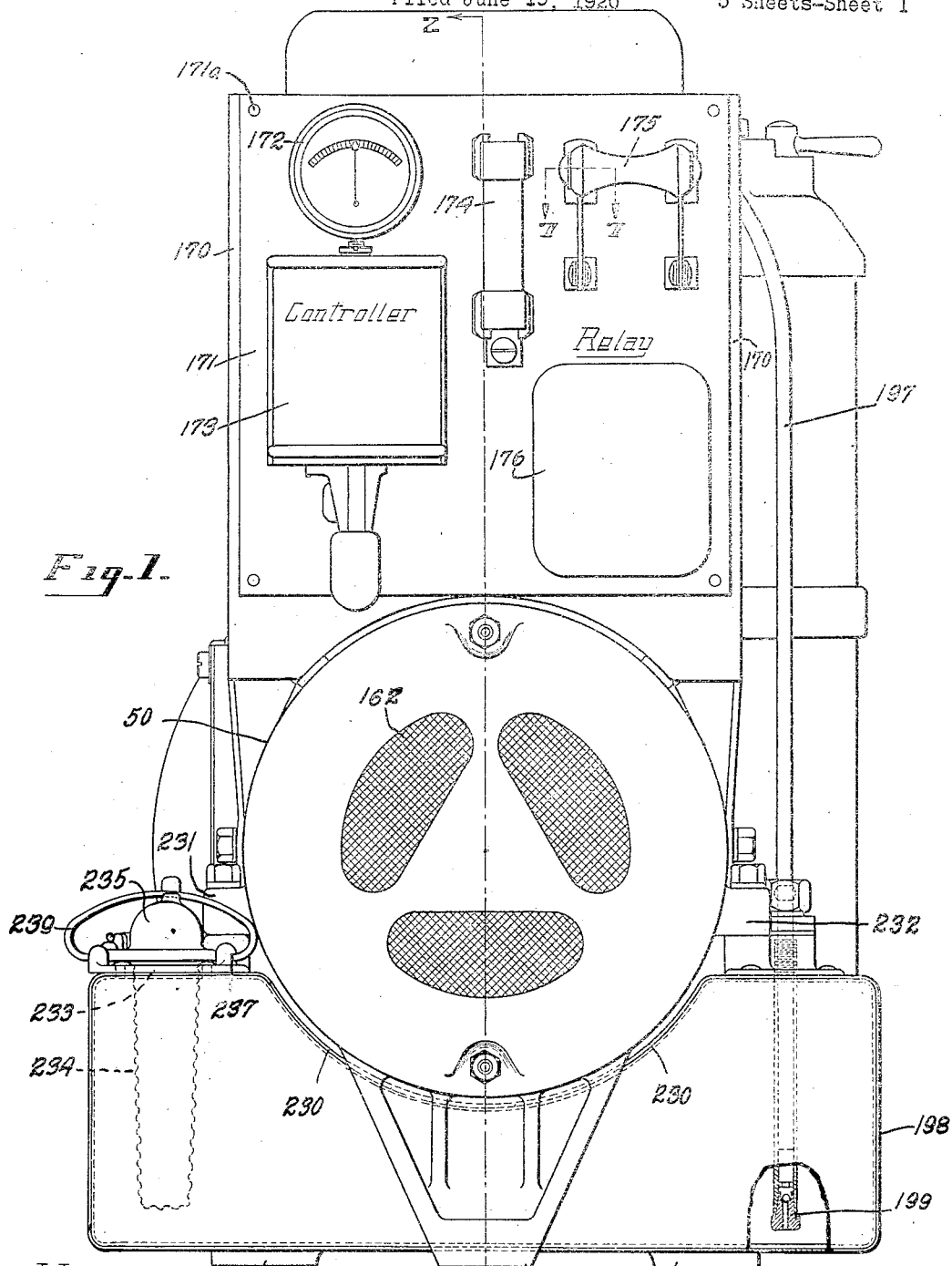

L. S. KEILHOLTZ ET AL 1,526,988

POWER PLANT

Filed June 19, 1920    5 Sheets-Sheet 2

Witnesses
Warren Schmieding
Charles Green

Inventors
Lester S. Keilholtz and Ernest Dickey
J. Ralph Fiehr
By
Attorney

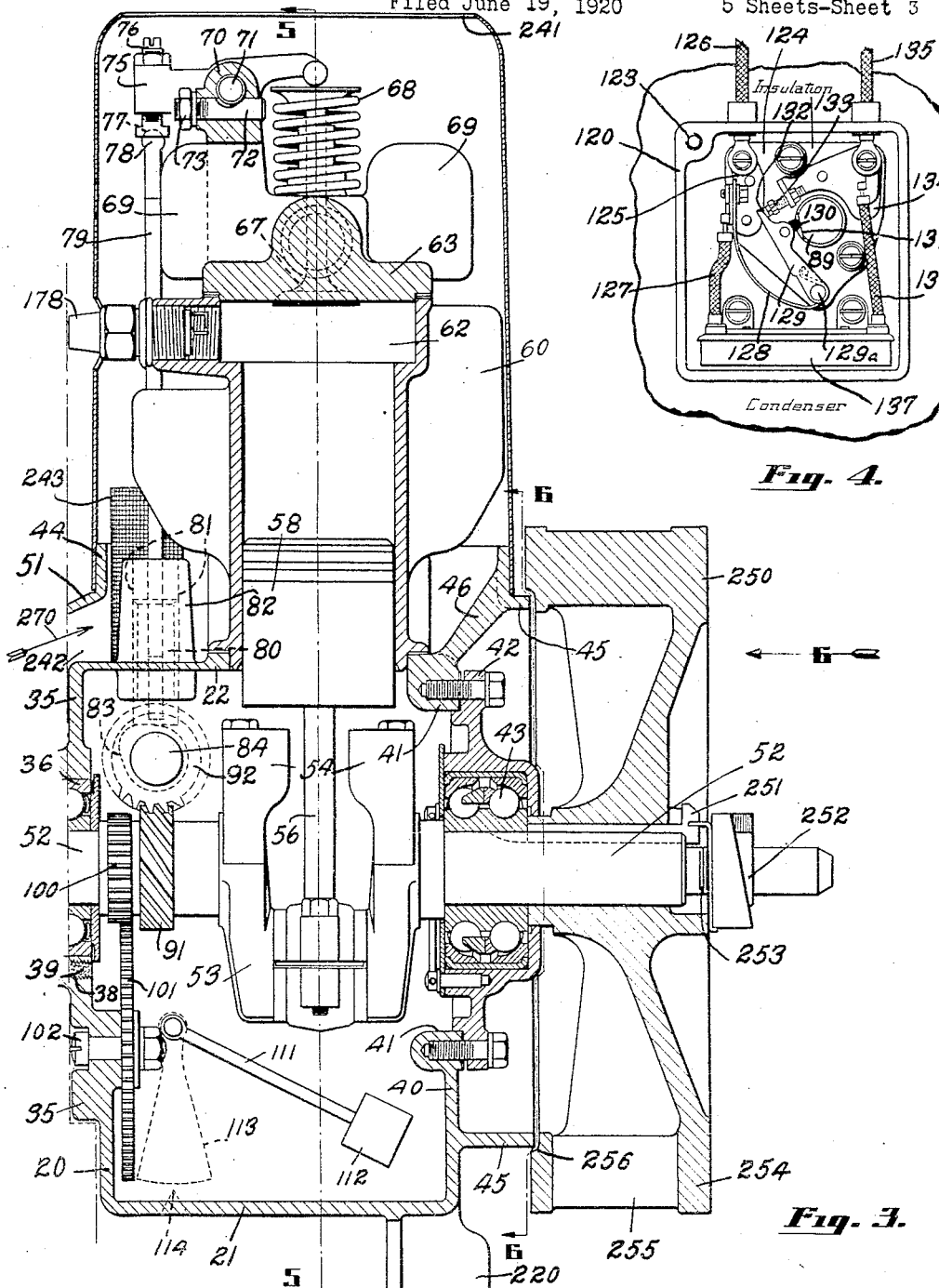

Feb. 17, 1925. 1,526,988

L. S. KEILHOLTZ ET AL

POWER PLANT

Filed June 19, 1920 5 Sheets-Sheet 4

Witnesses
Warren Schmieding
Charles Greene

Inventors
Lester S. Keilholtz and Ernest Dickey
By J. Ralph Fehr
Attorney

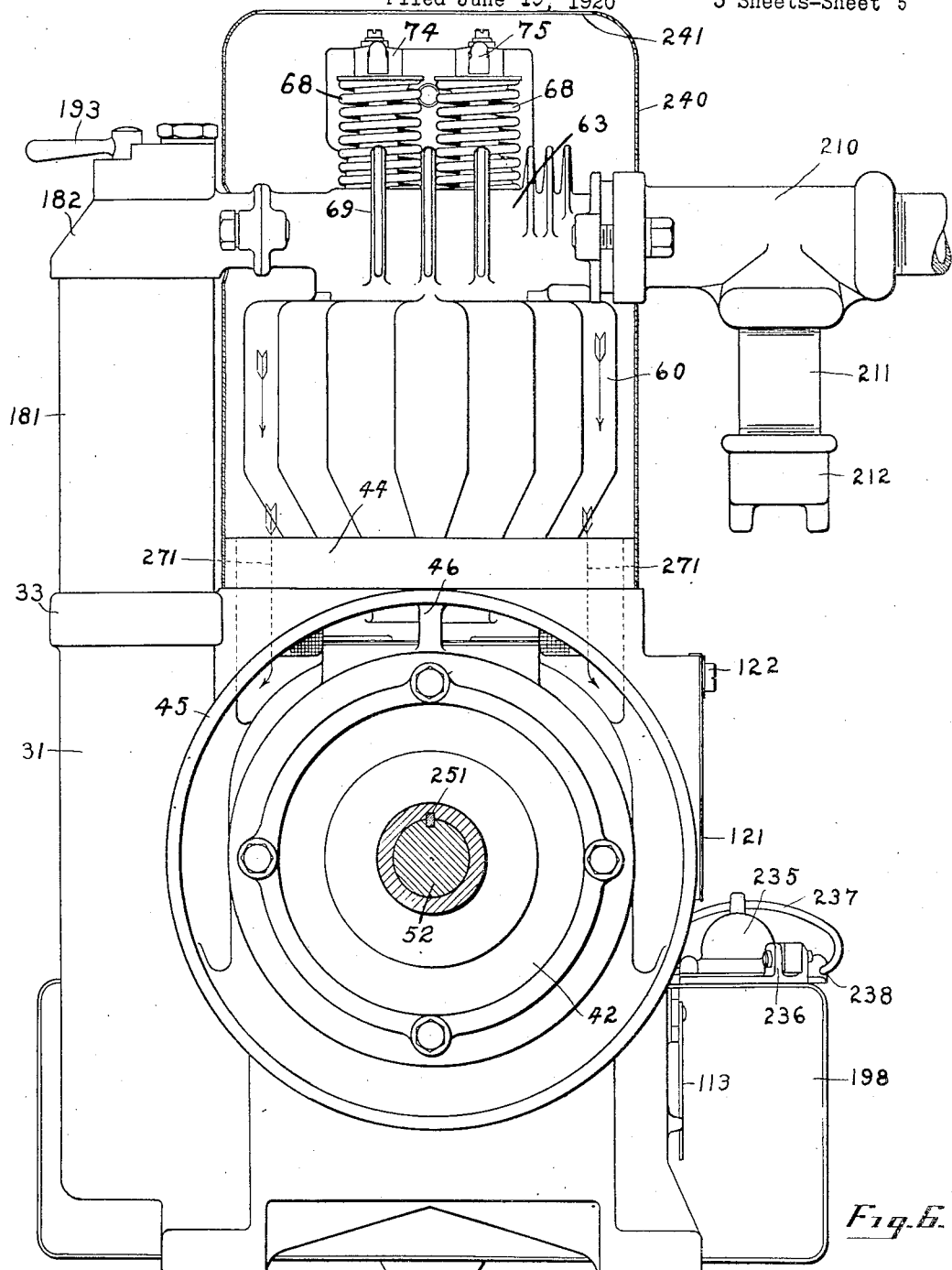

Patented Feb. 17, 1925.

1,526,988

UNITED STATES PATENT OFFICE.

LESTER S. KEILHOLTZ AND ERNEST DICKEY, OF DAYTON, OHIO, ASSIGNORS TO DELCO-LIGHT COMPANY, OF DAYTON, OHIO, A CORPORATION OF DELAWARE.

POWER PLANT.

Application filed June 19, 1920. Serial No. 390,247.

*To all whom it may concern:*

Be it known that we, LESTER S. KEILHOLTZ and ERNEST DICKEY, citizens of the United States of America, residing at Dayton, county of Montgomery, and State of Ohio, have invented certain new and useful Improvements in Power Plants, of which the following is a full, clear, and exact description.

This invention relates to power plants which include dynamo machines driven by internal-combustion engines.

This invention has among its objects the provisions of certain improvements in power plants described in the patent to Charles F. Kettering and William A. Chryst, No. 1,341,327, dated May 25, 1920, and the patent to Ernest Dickey No. 1,271,140, dated July 2, 1918.

More particularly this invention has among its objects to simplify the construction of power plants whereby to reduce the cost of manufacturing and to facilitate operation and making repairs.

One manner of carrying out the foregoing object is to construct the generator frame integrally with the engine crank case. In Patent No. 1,341,327 referred to the generator frame is secured to the engine crank case by means of bolts or other fastening means.

A further object of the invention is to reduce the liability of oil being forced out through the engine bearings during the operation of the engine. In carrying out this object of the invention, instead of air entering the fuel mixing chamber directly from the outside atmosphere, the air is sucked by the operation of the engine through the engine bearings and through joints in the engine crank case, from the crank case the air is conducted directly to the fuel mixing chamber. The provisions for conducting any air in the manner referred to also prevents the escape of noxious fumes from the crank case except out through the engine exhaust.

A further object of the invention is to provide improvements in the lubricating system described and claimed in the patent to E. Dickey No. 1,271,140.

A further object is to provide means in the construction and location of the fuel tank whereby the engine, generator and fuel tank may be formed in a compact unitary structure.

Other and further objects of the present invention will be apparent from the following description, reference being had to the accompanying drawings wherein a preferred embodiment of one form of the present invention is clearly shown.

Referring to the drawings:

Fig. 1 is an end elevation of the power unit looking in the direction of the arrow 1 of Fig. 2;

Figs. 2 and 3, taken together disclose a longitudinal sectional view taken on the line 2—2 of Fig. 1;

Fig. 4 is a fragmentary side view of a portion of the crank case looking in the direction of the arrow 4 in Fig. 5, showing a view of the ignition timer;

Fig. 6 is an end elevation looking in the direction of arrow 6 of Fig. 3, partly in section, the section being taken on the line 6—6 of Fig. 3;

Figure 7:
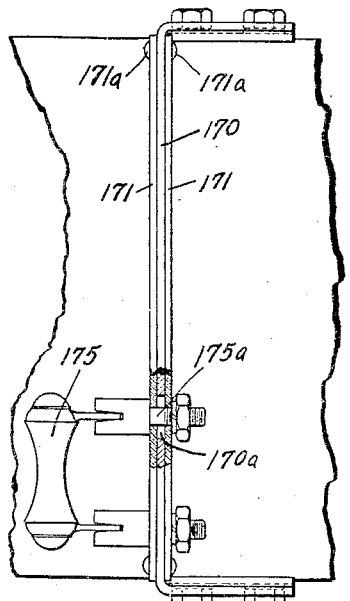
Fig. 7 is a fragmentary top view of the generator and switchboard panel looking in the direction of arrow 7 in Fig. 2, a portion of the panel being in section, the section being taken on line 7—7 of Fig. 1.

Referring to the drawings, the power unit includes a crank case 20 having a substantially flat bottom wall 21, and a substantially arched upper wall 22. Wall 22 is joined to wall 21 by a substantially straight side wall 23. A wall 24 extends downwardly from wall 22 and then laterally as indicated at 25 and then downwardly as indicated at 26 to join the bottom wall 21. In this manner the extension 27 of the crank case is provided. The wall 25 is provided with a threaded aperture to receive a plug 28 which may be removed to provide for the filling of the crank case with lubricant. The wall 25 is located at such a distance above the wall 21 as to serve as a gauge to determine the correct amount of oil to be placed in the crank case. That is, when the crank case standing in a vertical position is filled with oil until the oil comes up to wall 25, then sufficient lubricant has been placed in the crank case.

The air passage 30 leads out from crank case 20, this passage being provided for by means of a tubular extension 31 which is formed to unite with the walls 24, 25, 26 and 21. Communication between the crank case 20 and the passage 30 is provided for between the lower extremity 24ᵃ of that portion of wall 24 which separates the passage from crank case 20, and the lubricant level indicated by the dot and dash line 32 in Fig. 5. The extension 31 is provided with an annular flange 33 which is formed with a recess 34 for a purpose to be described.

The crank case 20 is provided also with an end wall 35, see Fig. 3, which joins with the upper wall 22 and with the lower wall 21. The wall 35 supports a ball bearing 36, and is provided with an oil catching groove 37 in communication with a hole 38 leading back to the crank case 20. This hole 38 is plugged with a piece of felt or other oil absorbing material 39 for a purpose to be described. Opposite to the end wall 35, the crank case 20 is provided with an end wall 40 which is opened at 41 to provide for the removal of the crank shaft, which will be described. This opening 41 is normally closed by a removable cover plate 42 supporting a ball bearing 43.

A substantially circular flange 44 extends upwardly from upper wall 22 and around toward the end wall 40 of the crank case, where said flange 44 blends in with circular flange 45 extending outwardly from the end wall 40. This flange 45 is concentrically arranged with respect to the bearing 43. At a point substantially vertically above bearing 43 the flanges 44 and 45 are connected by means of support and reenforcing rib 46.

Outwardly from the end wall 35 of crank case 20, there extends a generator field frame 50 which is arranged concentrically with relation to the bearing 36. The upper portion of this frame 50 blends, as indicated by frame 51, into the flange 44. In this manner communication between the interior of the frame 50 and the space included within the flange 44 is provided. It will also be seen that communication is provided between the space included within the flanges 44 and 45, respectively.

The bearings 36 and 43 support a crank shaft 52 provided with crank arms 53 carrying counter-weights 54. Crank arms are united by a crank pin 55 connected by means of connecting rod 56 with piston pin 57 carried by piston 58. Piston 58 slides within cylinder 59 having fins 60 and supported by wall 22 and having its downwardly extending annular flange fitting within a circular orifice provided in the wall 22.

Cylinder 59 is flared out at its upper end to provide a combustion chamber 62 having a greater diameter than that portion of the cylinder within which the piston 58 reciprocates. Above the combustion chamber 62, the cylinder 59 supports cylinder head 63 provided with an intake passage 64 and with an exhaust passage 65. Communication between passages 64 and 65 and the combustion chamber 62 is controlled by means of intake and exhaust valves 66 and 67, respectively, which are normally maintained in closed position by means of springs 68. The cylinder head 63 is provided with radiating fins 69 certain of which, as indicated by numeral 70, are arranged to provide a rocker arm support or bracket. This bracket 70 supports a rod 71 maintained in position by means of locking bolt 72 and nut 73. Rod 71 supports rocker arms 74 and 75 cooperating with valves 66 and 67, respectively. Each of these rocker arms is provided with an adjustable screw 76 having a ball socket 77 at its lower end cooperating with a spherical projection 78 provided on the upper end of the push rod 79. The lower end of push rod 79 is connected with a plunger 80 which reciprocates within a bearing 81 provided in a boss 82 which projects from the upper wall 22 of the crank case. Each plunger 80 cooperates with a valve cam 83 suitably arranged upon a cam shaft 84. Cam shaft 84 is provided with an enlarged journal 85 mounted within a bearing 86 provided by an extension of the wall 24. The bearing 86 is normally closed by means of a cover 87. The other end of cam shaft 84 is provided with a shoulder 88 and with a reduced portion 89 journalled within a bearing 90 provided by wall 23. Crank shaft 52 carries a timer gear 91 cooperating with a gear 92 mounted on cam shaft 84. It will be understood that the relation of crank pin 55, gears 91 and 92, and cams 83 is such as to time the operation of the valves 66 and 67 in such a manner as to produce the desired operation of the engine.

Crank shaft 52 supports a gear 100 cooperating with an oil throwing gear 101 pivotally mounted upon a bolt 102 supported by an end wall 35 of crank case 20. The functions of these gears 101 and 100 are particularly described and claimed in the patent of Ernest Dickey, Patent No. 1,271,140.

The side wall 23 supports a shaft 110 carrying near the crank case 20 a lever 111 supporting at its end a float 112. Outside the wall 23, the shaft 110 supports a scale member 113 cooperating with an index mark or lug 114 provided on the exterior of wall 23.

The wall 23 is provided with a substantially rectangular flange 120, see particularly Fig. 4. This flange 120 is preferably covered by plate 121 which may be pivotally mounted at one corner by screw 122 having screw threaded engagement with hole 123 provided in the corner of flange 120. In this manner a box-like housing is provided for a timer which will now be described. A nonconducting plate 124 is secured to the wall 23 inside the flange 120, and this plate 124 supports a terminal clip 125 connected with a wire 126, with a wire 127 and with a leaf spring 128. Leaf spring 128 cooperates with a breaker lever 129 pivotally mounted at 129a upon plate 124 to maintain a nonconducting follower 130 against the reduced portion 89 of the cam shaft 84. However, as shown in Fig. 4, the follower 130 is relieved of pressure against the shaft 89 by reason of the shaft 89 having turned so that a flattened portion 131 has been brought adjacent the follower 130. When in the position shown the contact 132 carried by lever 129 will be brought into engagement with contact 133 for the purpose of closing the ignition circuit of the engine. The contact 133 is adjustably mounted upon a terminal plate 134 which is connected with a wire 135 and with a wire 136. It will be understood that the flattened surface 131 is so constructed and arranged with the contacts 132 and 133 that they will remain in engagement the desired length of time to furnish current to the ignition apparatus of the engine, and so that the follower 130 will be engaged by the flattened surface 131 to separate the contacts 132 and 133 at the proper instant for firing the fuel charge in the cylinder. Wires 126 and 135 are connected with ignition system of the engine. The wires 127 and 136 are connected with a condenser 137 which is included within the flange 120 and cover 121.

The field frame 50 supports pole pieces 140 each of which comprises a plurality of laminations connected together by means of a rivet 141. Pole pieces 140 are secured to pole field 50 by means of screws 142 passing through certain of the laminations and through the rivets 141. Pole pieces 140 are surrounded by field windings 143.

Crank shaft 52 supports a sleeve 150a carrying armature 150 and commutator 151.

Figure 8:
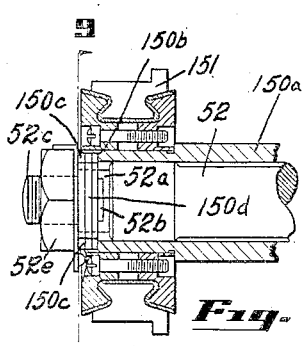
Fig. 8 is a fragmentary longitudinal sectional view of the armature and shaft.
Figure 9:
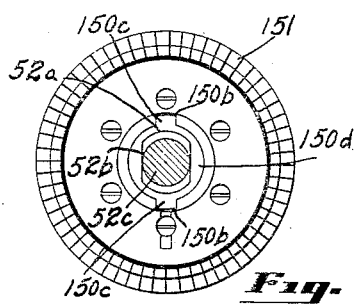
Fig. 9 is a sectional view on line 9—9 of Fig. 8.
Figure 2:
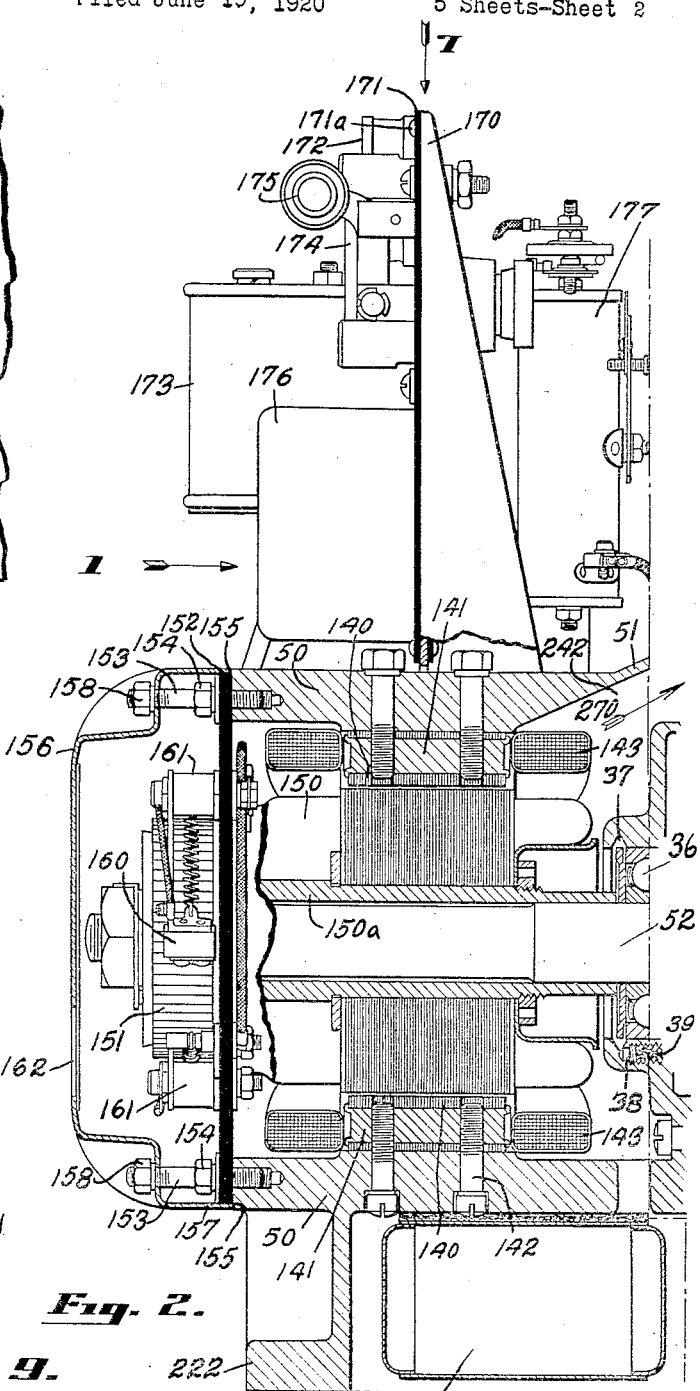

Referring to Figs. 2, 8, and 9, the driving connection between sleeve 150a and shaft 52 will be described. Shaft 52 is provided with a reduced end 52a having flat portions 52b and with a further reduced end 52c which is threaded. Shaft 150a is provided with notches 150b which cooperate with the tongues 150c of washers 150d having flat sided holes conforming to the section of the reduced and flattened portion 52a, 52b of shaft 52. By loosening nut 52c the washers 150d and the sleeve 150a may be removed from shaft 52.

Field frame 50 supports a non-conducting brush arm bracket 152 which is preferably ring shaped to provide for the projection therethrough of the commutator 151. This bracket 152 is smaller in diameter than the outside diameter of field frame 50 and is secured in concentric relation thereto, by means of studs 153 having hexagonal shoulders 154, to provide an annular groove indicated by numeral 155. The generator end cover 156 preferably constructed of stamped material is provided with an annular flange 157 fitting into groove 155 and having its external diameter substantially equal to the external diameter of the frame 50. Cover 156 is maintained in position by means of studs 153 and nuts 158. In this manner the cover 156 cooperates with the frame 50 to provide a housing for a plurality of brushes 160 carried by a plurality of brush arms 161 supported by the brush bracket 152. The cover 156 is provided with a plurality of screened openings 162 to provide for the inflow of air through the generator in the manner to be described.

The generator frame supports a metallic instrument board frame 170 faced front and back with non-conducting panels 171. Panels 171 are secured to frame 170 by rivets 171a. Panels 170 and 171 together form an instrument board carrying such apparatus as is necessary to the control of the electrical systems of the power unit. As shown the panels 171 carry an ammeter 172, a controller 173 for causing the dynamo, which has just been described, to operate to start the engine, a fuse 174, a knife blade switch 175, a relay 176, and an ignition coil 177. As shown in Figs. 2 and 3, the ignition coil is connected with spark plug 178 projecting into the combustion chamber 62.

Wherever an instrument terminal such as terminal 175a of switch 175 extends through the panels 171, a hole 170a is provided in frame 170. This hole 170a is much greater in diameter than that portion of terminal 175a which projects through it. The openings in panels 171 for the projection therethrough of terminal 175a are slightly greater than the terminal 175a. In this manner a very simple and efficient non-conduction mounting for the instruments is provided.

A washer 180, preferably of felt, is seated within the recess 34 and a breather tube 181 fits within the recess 34 and down against washer 180 in order to make a tight joint between breather tube 181 and the extension 31. A carburetor 182 is provided with an annular groove 183 in which is located a felt washer 184 and into which the upper end of tube 181 projects. The carburetor 182 is provided with a passage 185 leading from the breather tube into the inlet passages 186 and 187 of throttle valve 188. The lower face 189 of carburetor 182 is finished to provide a seat for a disc valve 190 having an opening 191, and shaft 192 carries the valve 190 at a lower end and at its upper end said shaft is provided with a lever 193. A spring 194 is interposed between lever 193 and the bottom of the recess 195 provided in carburetor frame 182. This spring 194 maintains the valve 190 yieldingly upon the seat 189. The carburetor is provided with a fuel intake passage 196 which is connected with a pipe 197 extending down adjacent the bottom of the fuel tank 198 and provided with a check valve 199 at its lower end.

The admission of fuel from the intake passages 186 and 187 of throttle valve 188 to the outlet passage 200 is controlled by a balanced valve 201 which is supported by a solenoid armature 202. Armature 202 co-operates with a solenoid magnet winding 203 contained within a casing 204 mounted upon the valve structure 188 and passage 200 leading directly into the intake passage 64. It is to be understood that the solenoid winding 203 may be connected with the generator in such a way that the speed of the engine will be limited to a certain value depending upon the voltage of the generator which corresponds to this speed. Normally the valve 201 is open, but as shown this valve is in a closed position, it being assumed that the voltage of the generator has risen to such value as to cause the solenoid 203 to operate to close the valve 201 thereby tending to cut down the speed of the engine.

A throttle valve 188 may be omitted if desired, the passage 185 being connected directly with intake passage 64. The mixture supplied to the engine is then controlled by moving the lever 193 to control the admission of air to the carburetor. By cutting off the supply of air to the engine intake the engine may be stopped.

The exhaust pipe 210 which is connected with the exhaust passage 65 is provided with a branch pipe 211 terminating with a cap 212. Fittings 211, 212 provide a pocket for the accumulation of moisture which during the time the engine is not in operation would tend to run back through the pipe 210 and into the engine, if some means of collecting this moisture before it reaches the engine were not provided. During the operation of the engine the fittings 211, 212 become heated by means of exhaust pipe 210, and the collected moisture will soon become evaporated and will pass with the engine exhaust out through the pipe 210.

The integral construction of the generator frame and crank case possesses certain important advantages, among which may be mentioned the reduction in cost of manufacture and the improved electrical efficiency of the generator brought about by the more accurate and the more uniform positioning of the generator elements with respect to one another. The integral construction eliminates the expensive machining, fitting and adjusting of the generator frame on the crank case, and at the same time makes possible the machining of the generator frame and shaft bearing in a single operation, thereby facilitating the accurate centering and alignment of the armature within the bore of the generator frame and enabling the use of a smaller and a more uniform air gap. It is well known that the inaccurate centering of the armature in the bore of the generator frame results in irregularities in the strength of the magnetic field, sets up stresses in the shaft, and has other disadvantages, all of which are greatly reduced, with a corresponding increase of efficiency, in the construction described.

The combined generator frame and crank case casting is supported upon a floor by three legs 220, 221 and 222. Thus a tripod support is provided for the power unit, thereby facilitating the installation of the power unit upon a foundation.

The tank 198 is constructed as indicated at 230 so as to conform with the under cylindrical surface of the generator frame 50. Tank 198 is supported by lugs 231 and 232 projecting outwardly from frame 50. The filler opening indicated at 233 is provided with a strainer 234, and is closed by a cap 235 which is pivoted at 236 and which is yieldingly maintained in closed position by spring bale 239 pivoted at 237 and 238.

Figure 5:
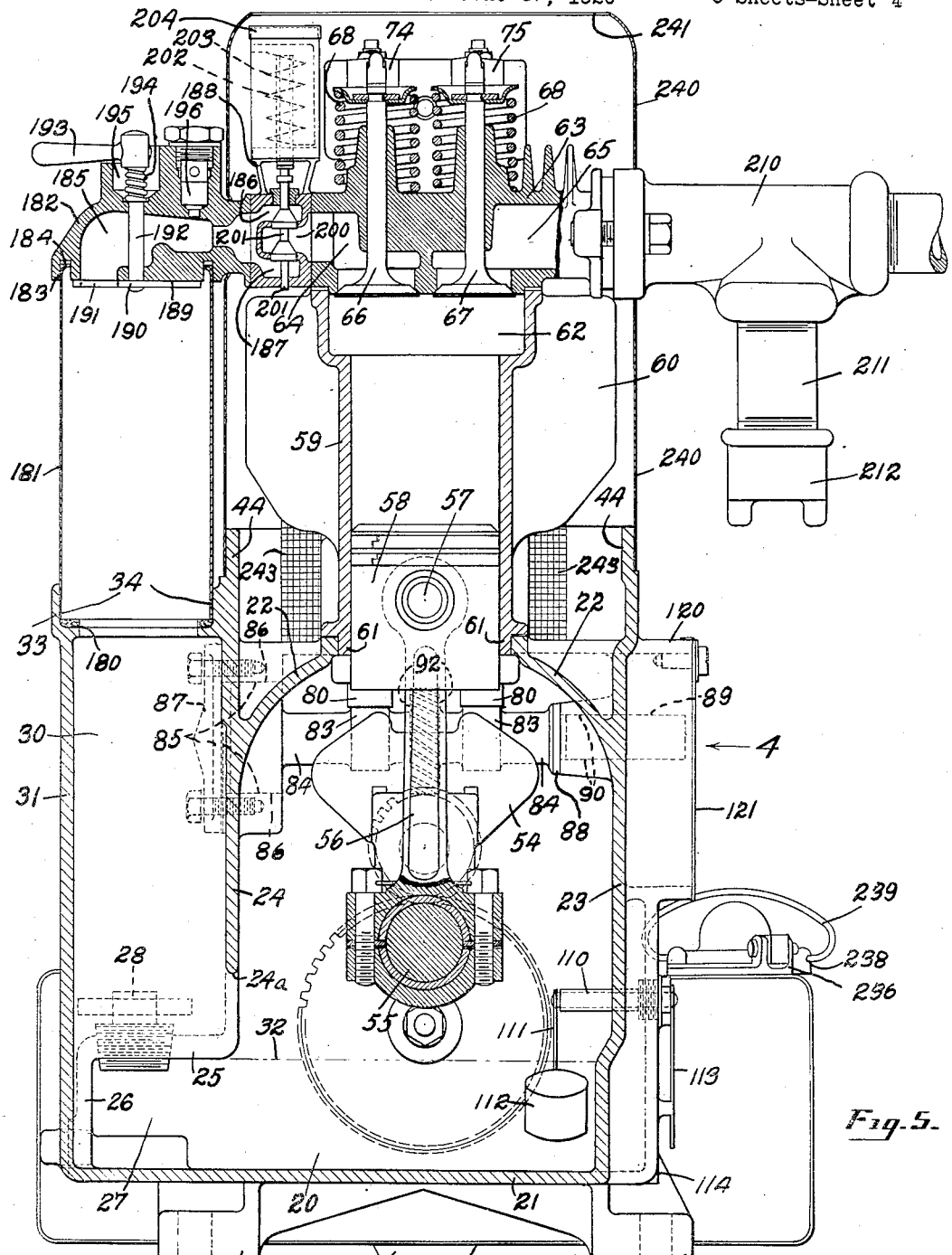
Fig. 5 is a transverse sectional view of the power unit, the section being taken substantially on the line 5—5 of Fig. 3.

Referring more particularly to Figs. 3, 5, and 6, the flange 44 supports a draft tube 240 which performs substantially the same function as the draft tube described and claimed in the patent to Charles F. Kettering and William A. Chryst, No. 1,341,327, dated May 25, 1920. In the present invention the draft tube is made in one piece.

As is described, the generator frame 50 projects generally from the end wall 35 of crank case 20, but a portion 51 thereof is separated from said end wall 35 and blends with the flange 44 to provide a passage 242 leading into the space included within the flange 44. A screen 243 is interposed in the passage 242 and the lower end thereof rests upon the upper wall of crank case 20. This screen 243 is for the purpose of preventing vermin entering the generator passages while the engine is not being used.

A flywheel 250 is secured upon the end of crank shaft 52 opposite the armature 150, and is secured to said shaft 52 by means of a key 251 and a nut 252 having engagement with a screw threaded end 253 of shaft 52. The flange 254 of flywheel 250 is provided with openings separated by peripherally arranged blades 255 by means of which the flywheel, when rotating, acts as a fan for cooling the engine and generator. The flange 254 is provided with an annular groove 256 conforming with the edge of the annular flange 45, and overhanging the same to assist in preventing articles from dropping down between the flywheel and end wall 40 and cover 42 of the crank case 20, and also to provide a crooked path tending to prevent the leakage of air between said flange 254 and flange 45.

During the operation of the engine, the suction of the engine draws fuel up from the tank 198 through the pipe 197 to the fuel passage 196 of carburetor 182. At the same time the suction produced within the crank case upon the upward stroke of piston 58 causes air to come into the crank case particularly through the crank case bearings. This air will mix in with fumes which are in the crank case by reason of leakage around the piston 58. This air more or less mixed with fumes will be forced by piston pressure on one side and by suction of the engine upwardly through the passage 30, breather tube 181 to passage 185. In this passage 185 the air will mix with the fuel which comes down through passage 196. The fuel mixture will pass into the engine through the valve 188 or may pass directly into the intake passage 64 from passage 185 in case the valve 188 is not used and the carburetor 182 is directly secured to the cylinder head 63.

During the operation of the engine the parts contained within the crank case are lubricated by the operation of gears 101, 100, 91 and 92. This operation is particularly claimed and described in the patent to Ernest Dickey, No. 1,271,140. The bearing 36 receives lubricant thrown off from the gear 100. As already described the surplus is accumulated and returned through the passage 38. It has been found, especially in small engines wherein the volume of the crank case is small relative to the piston displacement, that upon the downward movement of the piston there will be a tendency for oil to pass out through the passage 38. This forcing out of oil is prevented by a felt or other fibrous or porous plug 39, but this plug 39 permits oil to be drawn back into the crank case from the oil groove 37 especially during the upward stroke of the piston when the pressure in the crank case is reduced.

During the operation of the engine the flywheel 250 operates to cool the engine and generator parts after the manner described in the patent to Kettering and Chryst above referred to. Air will be sucked downwardly through the opening 241 in the open end of draft tube 240 then downwardly around the cylinder head 63 and cylinder 59 to cool the same. At the same time air will be drawn in through the screened opening 162 in generator cover 56 and then around the generator parts and through the passage 242 as indicated by arrow 270. The generator cooling air will mingle with the engine cylinder cooling air in the space included in the flange 44 from whence the cooling air will pass as indicated by arrows 271 into the space included within the flange 45 and thence outwardly between fan blades 255.

The preferred method of constructing the instrument board is to provide the metallic frame 170 or intermediate lamina with a series of holes spaced correctly to permit the projection therethrough of the various terminals or fastening portions of the switches and instruments to be located thereon, and to make those holes substantially larger than these terminals or fastening portions so that when a terminal is located concentrically with respect to its hole in frame 170, said terminal will be spaced from frame 170 sufficiently to provide the necessary insulation. The outside laminæ or non-conducting panels 171 are provided with similarly spaced holes, these holes being preferably slightly larger than the portions of the instruments which are to project therethrough. These laminæ are superimposed with the holes thereof in alignment, and then the laminæ are permanently secured together in any suitable manner.

While the form of mechanism herein shown and described constitutes a preferred embodiment of one form of the invention, it is to be understood that other forms might be adopted and various changes and alterations made in the shape, size, and proportions of the elements therein, without departing from the spirit and scope of the invention.

What we claim is as follows:

1. In a unitary power and generating plant, in combination, an internal combustion engine including an engine cylinder, a crank case therefor and a crank shaft, a generator directly connected with the engine, said generator including a field frame connected with said crank case and an armature mounted on said crank shaft, means adapted to support the crank case and field frame a short distance above a supporting base, and a fuel tank between the field frame and the supporting base, said fuel tank being supported by the field frame and having its upper portion shaped to conform to the contour of the field frame and having its lower portion shaped to conform to the contour of the supporting base, and pipe means for connecting said fuel tank with the engine cylinder.

2. In a unitary power and generating plant, in combination, an internal combustion engine including an engine cylinder, a crank case therefor and a crank shaft, a generator directly connected with the engine, said generator including a field frame connected with said crank case and an armature mounted on said crank shaft, means adapted to support the crank case and field frame a short distance above a supporting surface, a fuel tank located beneath said field frame and having a horizontal lower wall and an upper wall conforming in outline to the contour of the lower portion of the field frame, said tank having portions extending laterally to either side of the field frame, and means cooperating with said laterally extending portions for filling the fuel tank and for withdrawing fuel to the engine cylinder.

3. In a unitary power and generating plant, in combination, an internal combustion engine including an engine cylinder, a crank case therefor and a crank shaft, a generator directly connected with the engine, said generator including a field frame extending laterally from the crank case, and an armature mounted on said crank shaft, said crank case being adapted to rest upon a supporting base, means adapted to support the field frame a short distance above the supporting base, and a fuel tank supported by the laterally extending field frame underneath the same and between the frame and supporting base.

4. In a unitary power and generating plant, in combination, an internal combustion engine including an engine cylinder, a crank case therefor and a crank shaft, a generator directly connected with the engine, said generator including a field frame having lugs, and an armature mounted on said crank shaft, said crank case being adapted to rest upon a supporting base, means adapted to support the field frame a short distance above the supporting base, and a fuel tank underneath the field frame supported by said lugs and between the field frame and the supporting base.

In testimony whereof we hereto affix our signatures.

LESTER S. KEILHOLTZ.
ERNEST DICKEY.

Witnesses:
MILDRED PEARE,
MARY LAYTON.